UNITED STATES PATENT OFFICE.

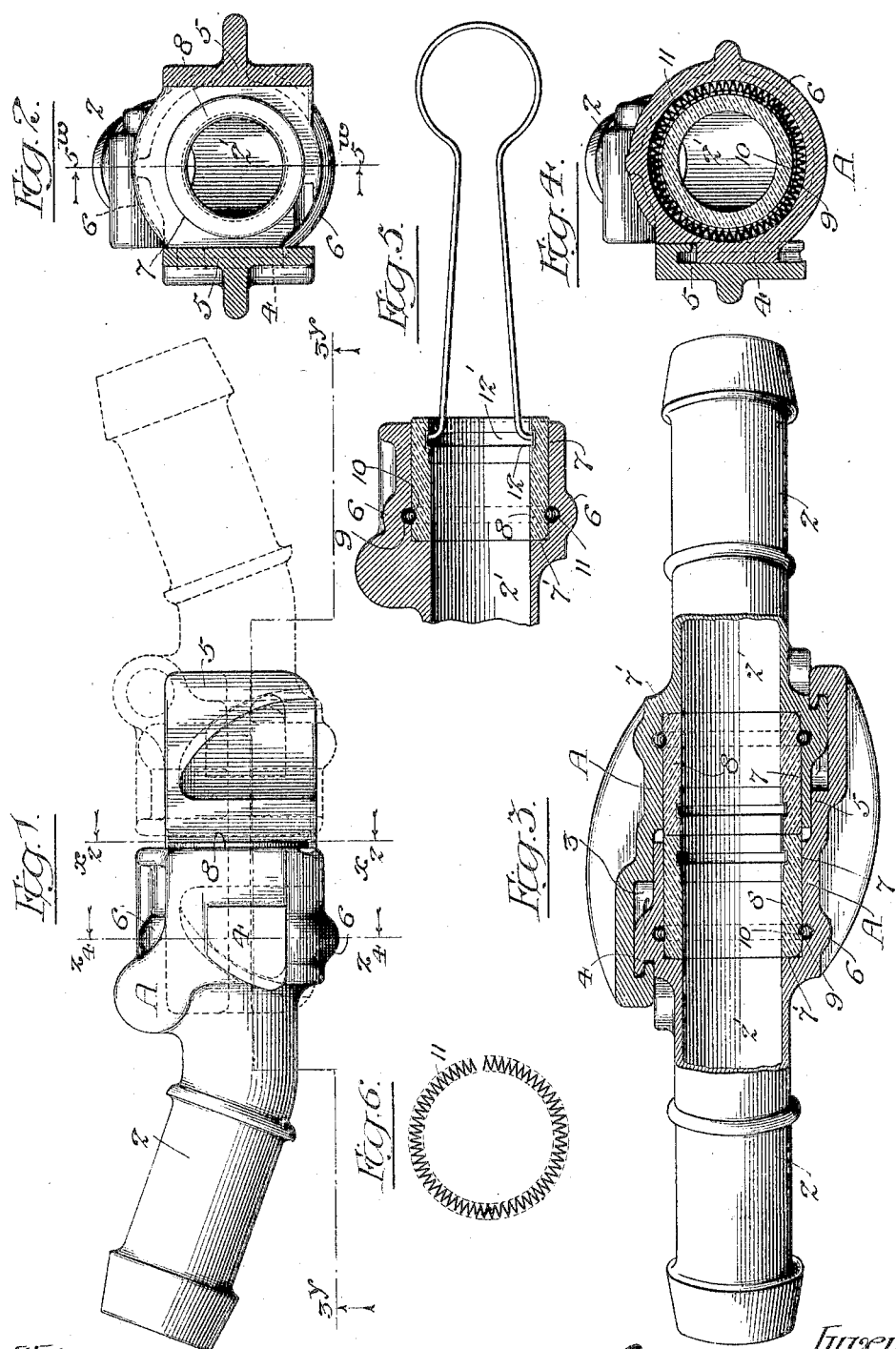

CARY WILLIAM MARTIN, OF DUNKIRK, NEW YORK, ASSIGNOR TO MARTIN CAR HEATING COMPANY, OF CHICAGO, ILLINOIS, A CORPORATION OF WEST VIRGINIA.

HOSE-COUPLING.

No. 802,462.      Specification of Letters Patent.      Patented Oct. 24, 1905.

Original application filed February 23, 1904, Serial No. 194,919. Divided and this application filed June 6, 1904. Serial No. 211,332.

*To all whom it may concern:*

Be it known that I, CARY WILLIAM MARTIN, a resident of Dunkirk, in the county of Chautauqua and State of New York, have invented certain new and useful Improvements in Hose-Couplings, of which the following is a specification.

My invention relates to improvements in hose-couplings such as are used for forming and completing the flexible connections between cars, and particularly relates to improvements in steam-hose couplings of that class in which the coupler comprises two elementary members containing packing-gaskets and each having a side arm or wing to engage a projection upon the other. The external dimensions of steam-hose couplings for railway use are in this country fixed and determined by the so-called "Master Car-Builders' Rules and Recommendations." These rules prescribe the dimensions that shall exist between the flat face or side of the coupler member and the inner side of the wing or arm thereof. The rule restricts the size of the gasket. Ever since it has been the practice to use abutting gaskets in such couplers manufacturers have found it necessary to provide means for holding the gaskets in place and in so doing have been compelled to use still smaller gaskets having openings of much less diameter than the duct or opening of the coupling proper. It is obvious that such gaskets materially decrease the carrying capacity of a flexible coupling. It is also true that in many cases the gaskets and the fastenings therefor lack durability, are clumsy and inefficient, and much trouble has been experienced through the failure of the coupler-gaskets and their frequent loss.

The objects of my invention are to provide a steam-hose coupler of uniform size throughout, to provide effective means for retaining the gasket in a coupler member and which shall remain in and be practically a permanent part of the coupler member ready at all times to receive and hold a gasket, to improve the form and arrangement of the coupler-gaskets and to so proportion the same that the expansion thereof may to a large extent be depended upon to tightly close the coupler-joint, and to provide a coupler that shall weigh much less than those in common use, and, furthermore, one wherein the members may and shall be formed to completely protect and armor the gaskets from injury on dislodgment.

With these objects in view my invention consists, primarily, in a hose-coupling of the class described comprising complementary members or heads provided with gasket-recesses and having projecting arms or wings in combination with long sleeve-like gaskets arranged in the enlarged portions or recesses of the heads and adapted to abut when the heads are placed together and suitable means within the recess of each said head for securing its contained gasket; and, further, my invention consists in various constructions and in combinations of parts, all as hereinafter described, and particularly pointed out in the claims.

The invention will be more readily understood by reference to the accompanying drawings, forming a part of this specification, and in which—

Figure 1 is a side elevation of a hose-coupling embodying my invention. Fig. 2 is a cross-section on the meeting line or joint $x^2 x^2$ of Fig. 1. Fig. 3 is a horizontal section on the line $y^3 y^3$ of Fig. 1. Fig. 4 is a cross-section on the line $z^4 z^4$ of Fig. 1. Fig. 5 is a partial vertical section on the line $5^w 5^w$ of Fig. 2.

For the sake of clearness one of the heads or members of the coupler is shown in dotted lines in Fig. 2, while Fig. 3 shows both members in full lines. The coupler comprises two heads or members A, each having a hose-nipple 2 and similar in shape to those commonly used in the art. One side 3 of each head is flat, except for the locking projection 4, while the other side is provided with an arm or wing 5 to receive the projection or lug of the opposite member. In these particulars the coupling conforms to the best practice of the day.

It will be noted that each head A of the coupling is provided with an external rib or extra thickness of metal 6 and that said rib occupies the transverse plane of the locking projection 4, forming, so to speak, a circumferential continuation thereof. Each head or member is provided with a deep recess or counterbore 7 of considerably greater diameter than the remainder of the opening or duct 2' in the head and nipple. The recess extends beyond the plane of the rib 6 and is of uniform diameter throughout to receive the long sleeve-like gasket 8. The internal diameter of this gasket equals the diameter of the duct or opening 2', yet the gasket is of sufficient thickness to be strong and durable. The gaskets 8 8 are slightly longer than the recesses which contain them, and when the two parts of the coupler are brought together and locked by partial rotation about a horizontal transverse axis the outer ends of the gaskets will abut and their inner ends will be forced snugly against the bottoms or shoulders 7' of the recesses 7. The ends of the gaskets extend so slightly beyond the ends of the coupler members that it is not possible for them to be injured in ordinary use, and they may, therefore, be referred to as being completely armored by the coupler-heads which contain them.

The joints of the coupler are made tight when the two members thereof are put together; but this is not all, for the gaskets are of such comparatively great length as to make their longitudinal expansion by steam an appreciable factor in the effective closing of the three joints of the coupler. Gaskets which have become so worn that they fail to close together when cold may be depended upon to tightly close the coupler as soon as the steam is admitted thereto. The expansion of the gaskets will be greater than their loss through wear. These long gaskets are made to snugly fit the coupler-heads, but must be positively secured therein. The relatively great internal diameter of the gaskets precludes the use of any of the well-known gasket-fasteners. This is also true of the gasket-armoring feature of my invention, there being no place or room for fastenings at the ends of the coupler members. It is here that I avail myself of the space or metal afforded by the circumferential enlargement, comprising the locking-lug 4 and the rib 6. As shown in Figs. 3, 4, and 5, I provide the same with internal groove 9 in the wall of the recess 7 and in the transverse plane of said rib 6. This groove is permanently occupied by a locking member that is adapted to engage a circumferential groove 10 in the inner end of the long gasket. When the end of the gasket is driven by the locking device, whatever its kind or nature, said locking device springs, contracts, or expands into the groove in the gasket and firmly secures the gasket to the coupler member. If desired, the gasket-groove may be used in conjunction with a locking device that does not require a groove 9, and the locking device need not inclose the gasket to come within the spirit and scope of my invention. I prefer to employ a ring-like fastener comprising a normally straight spiral coil 11 of wire, which may be easily placed in the internal groove of the coupler member and when so placed cannot be detached except by deliberate action upon it. A ring-like fastener of any kind may be used and will remain in the coupler member when the gasket is removed therefrom. Practically any number of gaskets may be driven into and removed from the coupler without dislodging the gasket-fastener. This fastening may therefore be referred to as a permanent part of the coupler to distinguish it from the readily-removable interchangeable gasket.

It should be observed that the gasket lock or fastening is not depended upon to force the gasket against the shoulder of the coupler-recess.

To facilitate the removal of the gasket, I provide it with an internal groove 12 to receive the prongs of a suitable tool, as shown in Fig. 5. The grooved part of the gasket may be protected and reinforced by a metal sheath or armor 12', if desired. The metal sheathing or sleeve also effectually prevents the collapsing of the gaskets.

The subject-matter hereof is derived from my pending application, entitled "Hose-coupling," Serial No. 194,919, filed February 23, 1904, this being a divisional application.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a hose-coupling, a coupler member provided with a locking-lug on one side and a locking arm or wing on the other side and having a gasket-recess, in combination with a sleeve-like gasket, having a peripheral groove normally in the transverse plane of said locking-lug and a gasket-fastener also in said plane, within said recess and groove, substantially as described.

2. In a hose-coupling, a coupler member provided with a locking-lug on one side and a locking arm or wing on the other side and having a gasket-recess, in combination with a sleeve-like gasket, having a peripheral groove normally in the transverse plane of said locking-lug, and a gasket-fastener also in said plane, within said recess and groove, and the walls of said member being thickened in proximity to the plane referred to, to accommodate said fastener, substantially as described.

3. In a hose-coupling, a coupler member, of the class described, having a duct and a cylindrical recess of greater diameter than said duct, in combination with a gasket of slightly greater length than said recess and of uniform external and internal diameters throughout, the opening therein equaling said duct, and a gasket-fastener provided in the walls of said recess, substantially as described.

4. A hose-coupler gasket, comprising a sleeve of uniform diameter throughout and having an external groove near one of its ends and an internal groove near the other end, substantially as described.

5. In a hose-coupling, a coupler member, having the usual nipple, provided with a locking-lug and a locking-arm on opposite sides and having a rib, 6, in the plane of said lug; in combination with a gasket-sleeve arranged in said member and having an external groove near its inner end, said member having an internal groove in the plane of said rib and lug; and, a ring-like gasket-fastener permanently occupying said internal groove and adapted to yield to the entrance of the grooved end of said gasket, substantially as described.

6. A hose-coupler gasket, comprising a long, non-metallic sleeve of uniform internal and external diameter throughout and having an external, peripheral gasket-fastener groove near one end, said sleeve being of sufficient length to render its expansion a useful factor in the maintenance of a tight coupler-joint, substantially as described.

7. A gasket for hose-couplings of the class described, comprising a long, cylindrical, non-metallic sleeve, having an external peripheral groove near one end and having that end beveled or rounded, the length of said sleeve being sufficient to render the expansion by heat a useful factor in the maintenance of a tight coupler-joint, substantially as described.

8. A gasket for couplings of the class described, comprising a cylindrical sleeve or tube of hard, non-metallic material, of the same internal and external diameter throughout, of sufficient length to render its expansion by heat a useful factor in making a tight coupler-joint, and having an external, peripheral gasket-fastener groove, in combination with a metallic armor in the outer end of said sleeve, as and for the purpose specified.

9. In a hose-coupling, a coupler member, provided with a cylindrical gasket-recess of uniform, greater diameter than the coupler-duct and having a gasket-fastener cavity in its cylindrical wall near its inner end, in combination with a gasket of uniform diameter fitting said recess throughout, and having a groove at its inner end, and a suitable gasket-fastener arranged in the recess and occupying the groove in said gasket, said fastener being wholly concealed within the recess by said gasket, and said gasket being concealed and armored by the walls of said recess, substantially as and for the purpose specified.

10. In a hose-coupling, a coupler member provided with a long longitudinal cylindrical recess; in combination with a non-metallic cylindrical sleeve-like gasket, of sufficient length to render its expansion by heat a useful factor in maintaining a tight coupler-joint, occupying and fitting said recess and provided with a peripheral groove; and a yielding or distensible fastening arranged in and projecting from the cylindrical wall of said recess and into the groove of said gasket, to secure the gasket, substantially as described.

11. In a hose-coupling, a coupler member having a side wing and a locking part and provided with a longitudinal duct and cylindrical recess, in combination with a sleeve-like gasket fitting said recess and fully armored by the walls thereof and means for removably fastening the gasket in said recess, said means being within the recess and concealed and made inaccessible by said gasket, substantially as described.

12. A hose-coupling of the class described, comprising two members adapted to be interlocked by partial rotation about a horizontal, transverse axis, and each provided with a deep cylindrical recess, in combination with gasket-fastening means in said recesses and sleeve-like, tubular gaskets, of sufficient length to render their expansion by heat a joint-closing factor, removably fitted in respective recesses, said gaskets being substantially wholly armored and concealed by the cylindrical walls of said member, substantially as described.

13. In a hose-coupling, a coupler member, provided with a long gasket-recess and having a locking projection on one side and a locking arm or wing on the other, to rotatably interlock with a like member, in combination with a long, usefully-expansible, sleeve-like gasket, secured in and fitting said recess throughout and, save for its extreme end, wholly inclosed and concealed within said member, substantially as described.

14. In a hose-coupling, a coupler member of the class described, provided with a cylindrical recess and a duct of smaller diameter than said recess, in combination with a sleeve-like gasket, fitting and filling said recess and removable therefrom, and a gasket-fastener relatively permanent in said recess and engaging the outer periphery of said gasket near its inner end, substantially as described.

15. In a hose-coupling, a coupler member, having the usual nipple and provided with a locking-lug and a locking-wing on opposite sides, in combination with a gasket-sleeve arranged in said member and having an external groove near its inner end, said member having an internal groove, and a ring-like gasket-fastener in said internal groove and adapted to yield to the forcible entrance and withdrawal of said gasket and also adapted to retain its position in said internal groove when the gasket is withdrawn, substantially as described.

16. In a hose-coupling of the class described, a coupler member having a side wing and a locking-lug and containing a duct and a gasket-recess, in combination with a relatively permanent gasket-fastener in the wall of said gasket-recess, and a sleeve-like gasket held in said recess by said fastener and therewith completely concealing and protecting said fastener, substantially as described.

17. A coupler of the class described, comprising two coupler members having interlocking wings and lugs and adapted to be interlocked by partial rotation on a horizontal transverse axis, each said member having a duct and a larger gasket-recess, in combination with non-metallic gaskets fitting said recesses, and rings formed of spiral coils of wire held in said recesses and removably securing the gaskets therein, substantially as described.

18. In a device of the class described, a coupler member, containing an internally-grooved gasket-recess, in combination with a gasket filling and fitting said recess, and a gasket-fastener in the groove of said recess and engaging said gasket, the arrangement of parts being such that said fastener can be placed in and removed from said recess only during the absence of said gasket, substantially as described.

19. In a hose-coupling of the class described, a coupler member having a gasket-recess in its end, in combination with a gasket-fastener provided in and projecting from the cylindrical wall of said recess, and a gasket fitting said recess and secured therein by said fastener and in turn securing said fastener and preventing the removal thereof until the gasket is removed from said recess, substantially as described.

In testimony whereof I have hereunto set my hand, this 1st day of June, 1904, at Chicago, Illinois.

CARY WILLIAM MARTIN.

In presence of—
  C. G. HAWLEY,
  JOHN R. LEFEVRE